US008807850B2

(12) United States Patent
Piccoli et al.

(10) Patent No.: US 8,807,850 B2
(45) Date of Patent: Aug. 19, 2014

(54) SUPPORT HEAD FOR AN OPTICAL OR VIDEO-PHOTOGRAPHIC APPARATUS

(75) Inventors: Igor Piccoli, Monticello Conte Otto (IT); Stelvio Zarpellon, Bassano del Grappa (IT); Enrico Cherubin, Cassola (IT); Francesco Cherubin, legal representative, Cassola (IT)

(73) Assignee: Lino Manfrotto + Co. S.p.A., Cassola (VI) (IT)

( * ) Notice: Subject to any disclaimer, the term of this patent is extended or adjusted under 35 U.S.C. 154(b) by 39 days.

(21) Appl. No.: 13/582,504

(22) PCT Filed: Mar. 3, 2011

(86) PCT No.: PCT/EP2011/053160
§ 371 (c)(1),
(2), (4) Date: Nov. 17, 2012

(87) PCT Pub. No.: WO2011/107531
PCT Pub. Date: Sep. 9, 2011

(65) Prior Publication Data
US 2013/0058638 A1 Mar. 7, 2013

(30) Foreign Application Priority Data
Mar. 4, 2010 (IT) .............................. PD2010A0065

(51) Int. Cl.
*G03B 17/00* (2006.01)
(52) U.S. Cl.
USPC ........................................................ 396/428
(58) Field of Classification Search
USPC .................. 396/419, 428; 348/373, 375, 376
See application file for complete search history.

(56) References Cited

U.S. PATENT DOCUMENTS

| 2,700,523 A | 1/1955 | Pollard |
| 2,802,633 A | 8/1957 | Moore |
| 4,733,838 A | 3/1988 | Van Der Lely |
| 4,763,151 A * | 8/1988 | Klinger ......................... 396/419 |
| 6,323,903 B1 * | 11/2001 | Poulsen et al. ................ 348/373 |
| 2010/0172643 A1 * | 7/2010 | Sudhana et al. .............. 396/428 |
| 2011/0006170 A1 * | 1/2011 | Liu et al. ....................... 248/121 |
| 2012/0099851 A1 * | 4/2012 | Brown ......................... 396/421 |

FOREIGN PATENT DOCUMENTS

GB  2227278 A  7/1990

OTHER PUBLICATIONS

ISR and Written Opinion in related PCT application PCT/EP2011/053160, Sep. 4, 2012.

* cited by examiner

*Primary Examiner* — Clayton E LaBalle
*Assistant Examiner* — Warren K Fenwick
(74) *Attorney, Agent, or Firm* — Kristina Castellano; Castellano PLLC

(57) ABSTRACT

A support head for an optical or video-photographic apparatus, having a first body traversed by a first axis of rotation with respect to a base of the head, a second body coupled in a rotary manner to the first body, a third body traversed by a second axis of rotation, and being coupled in a rotary manner to the second body. A user may lock by a single movement of a control member both the relative rotation of the first and second bodies about the first axis and the rotation of the second and third bodies about the second axis. The lock may be a tie-rod extended from the control member along the second axis and a slider connected to the tie-rod and interposed between the first body and the second body configured to lock the relative rotation of the second body with respect to the third body.

11 Claims, 2 Drawing Sheets

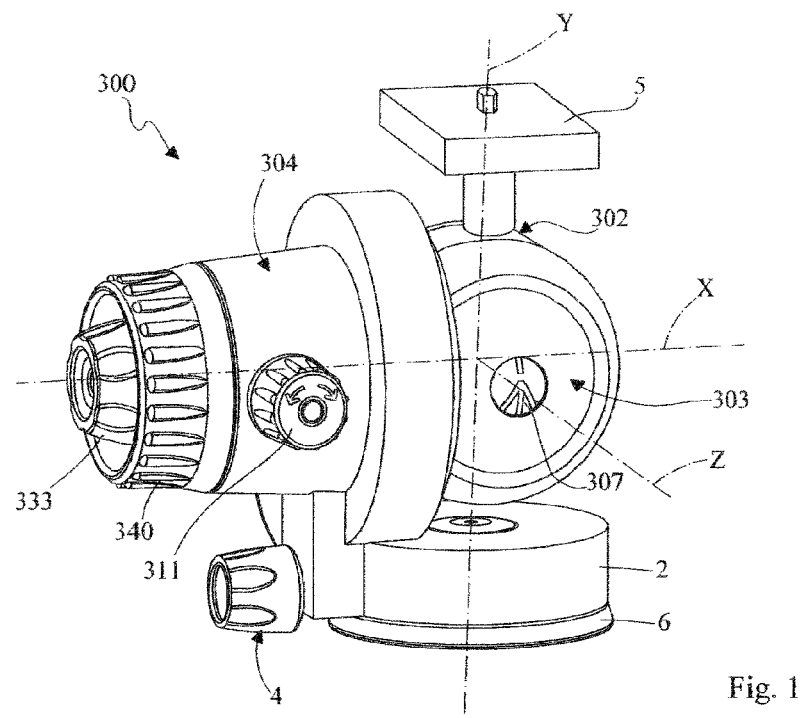
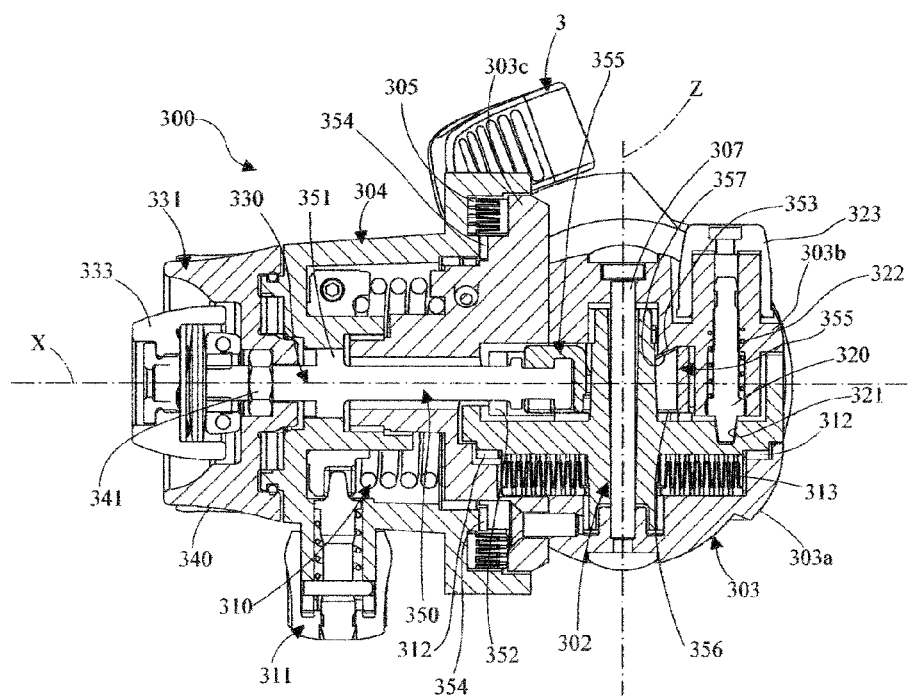

SUPPORT HEAD FOR AN OPTICAL OR VIDEO-PHOTOGRAPHIC APPARATUS

CLAIM FOR PRIORITY

This application is a U.S. National Stage Application of PCT/EP2011/053160 filed on Mar. 3, 2011, claiming priority to Italian patent application PD2010A000065 filed Mar. 4, 2010, the contents of both of which are incorporated herein by reference.

TECHNICAL FIELD

The present invention relates to a support head for an optical or video-photographic apparatus having the technical features set out in the preamble of the main claim.

TECHNOLOGICAL BACKGROUND

The present invention is more particularly directed towards a support head which allows rotational movement of the optical or video-photographic apparatus about two mutually perpendicular axes.

In the technical field being referred to, support heads which allow rotation of the optical or video-photographic apparatus about a so-called pan axis or a tilt axis or about a level axis are known.

In one standard configuration for mounting the video-photographic apparatus on the support head, the pan axis is a vertical axis and typically serves to rotate the apparatus by keeping it in the same horizontal plane (useful for horizontally adjusting a framing shot, for example, in panoramic shots), the tilt axis is a horizontal axis which serves to rotate the apparatus by keeping it in a vertical plane which extends through the optical axis of the apparatus (for vertically adjusting a framing shot) and the level axis is a horizontal axis which serves to rotate the apparatus by keeping it in a vertical plane which is perpendicular to the optical axis of the apparatus, useful for moving from a horizontal position (landscape position) to a vertical position (portrait position) of the apparatus.

There are particularly used support heads which are able to rotate at least about two of the three above-described axes.

Those support heads can be provided with locking mechanisms which are separate and independent for each axis of rotation or, conversely, can be provided with a mechanism which allows simultaneous locking/unlocking of the rotation about both axes with a single movement by the user.

An example of a mechanism of that second type which is widely used in the field is described, for example, in U.S. Pat. No. 6,739,559 and briefly comprises a first resiliently contractile collar which is connected to a pin which defines the pan axis, that first collar being open at two adjacent ends, from which there extend attachments which have a semi-cylindrical cross-section and which together define the tilt axis. Therefore, there is mounted, about the two semi-cylindrical attachments of the first collar, a second resiliently contractile collar which is open at the two ends thereof, from which there extend attachments which can be selectively moved together by actuating a clamping member, respectively. The second collar is further provided with attachment means for the video-photographic apparatus and the pin around which the first collar extends can be connected to (or is part of) a support structure, such as a tripod or the like.

With that device, the locking is brought about by acting on the single clamping member, for example, a threaded shaft, which moves together the attachments of the second contractile collar about the two semi-cylindrical attachments of the first collar, which in turn are moved together, clamping the first collar around the pin. In that manner, the second collar clamps around the attachments of the first collar, locking rotation about the tilt axis and the first collar becomes clamped around the pin, locking rotation about the pan axis.

However, the above-described known solution has some disadvantages, one of which is constituted by the non-simultaneous locking about the two axes. Actually, it is found that the locking of the two axes often occurs at quite distinct successive moments of time. It is considered that such a disadvantage is substantially attributable to the dimensional play and the different rigidities of the components of the device and that it could be limited by using specific materials and processing operations which are far more precise with low dimensional tolerances. However, that would involve an increase in costs which would act counter to the very aspect which constitutes the greatest advantage of this technical solution, that is to say, its cost-effectiveness.

Another disadvantage encountered in this type of locking mechanism is the "drift" effect which brings about a slight undesirable rotation of the first and/or second collar during the clamping movement thereof.

DISCLOSURE OF THE INVENTION

The problem addressed by the present invention is to realize a support head for optical or video-photographic apparatuses which is provided with a single control for locking rotation about two of the axes of rotation thereof and which is structurally and functionally configured to overcome the limitations set out above with reference to the cited prior art. This problem is solved by the present invention by means of a support head realized in accordance with the appended claims.

BRIEF DESCRIPTION OF THE DRAWINGS

The features and advantages of the invention will be better appreciated from the detailed description of a preferred embodiment thereof which is illustrated by way of non-limiting example with reference to the appended drawings, in which:

FIG. 1 is a schematic perspective front view of a support head for an optical or video-photographic apparatus according to the present invention, FIG. 2 is a longitudinal section of the support head of FIG. 1.

BEST MODE FOR CARRYING OUT THE INVENTION

Figure 3:
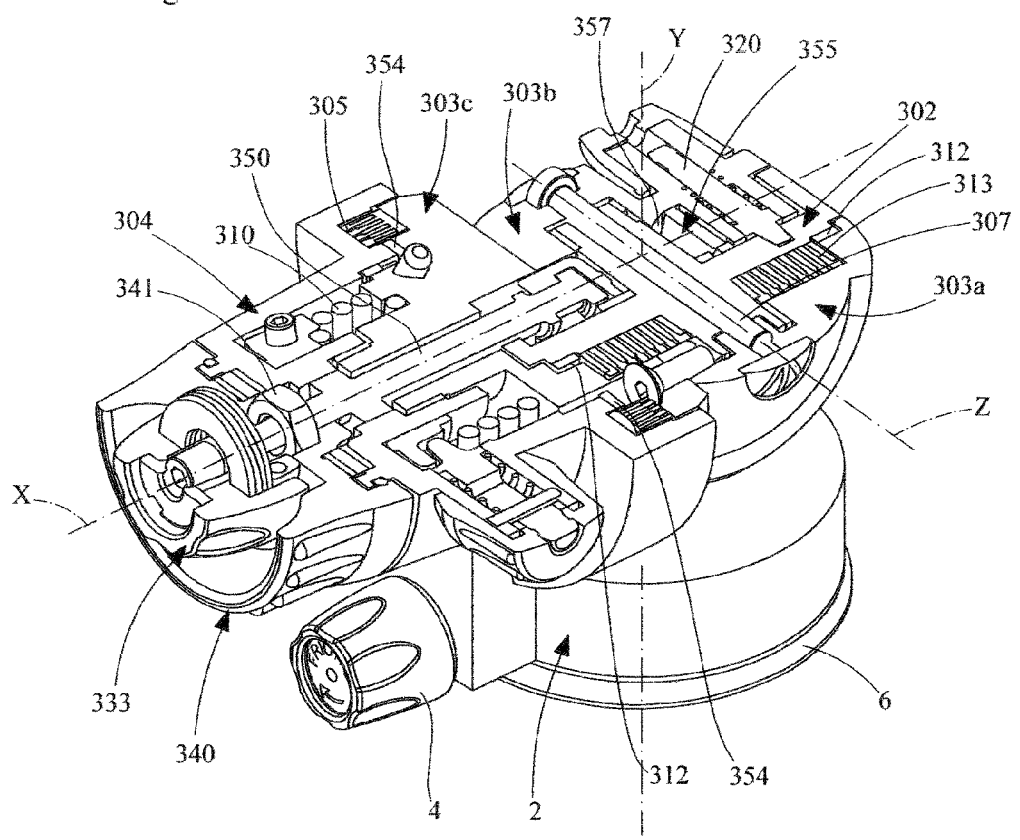
FIG. 3 is perspective view of the support head sectioned as in FIG. 2.

With reference to the appended Figures, a support head for an optical or video-photographic apparatus in accordance with the present invention, is generally designated 300.

The head 300 comprises a first body 302, to which there is rotatably connected a second body 303, on which there is in turn mounted, with the capacity for rotation, a third body 304, which forms a base of the head 300. The first body 302 forms a level body of the support head 300 and is provided with means 5 for attaching an optical or video-photographic apparatus, not illustrated in the appended drawings.

The second body 303 forms a tilt body of the support head 300 and is retained in rotatable connection with respect to the first body 302 by means of a threaded pin 307 defining a level axis Z, traversing both the first and the second body 302, 303, and forming a first axis of rotation of the apparatus with respect to the base of the support head.

The second body 303 comprises three different portions which are designated 303a, 303b and 303c and which are fixedly joined to each other, wherein the first and the second portion 303a and 303b are provided at the axially opposite sides of the first body 302 with respect to the level axis Z, and the third portion 303c extends laterally from the second portion 303b along a second axis X of the head 300, perpendicular to the level axis Z and forming a tilt axis of the support head 300.

A fluid type cartridge 313 is interposed between the first body 302 and the first portion 303a of the second body 303.

The third portion 303c of the second body 303 is connected to the third body 304 so as to be rotated about the tilt axis X and a fluid type cartridge 305 is further interposed between the second and the third body 303, 304. The third body 304 comprises a support disk 6 which is provided with attaching means for connecting the support head 300 to another support structure which is normally used in combination with a support head such as, for example, a tripod or a monopod.

The axis of the support disk 6 defines a pan axis Y of rotation of the optical or video-photographic apparatus with respect to the base of the head 300. The third body 304 also comprises a pan body 2 coupled to the support disk 6 so as to rotate about the pan axis Y, and pan locking means 3 as well as pan fractioning means 4 are also provided to lock and, respectively, friction the rotation of the pan body 2 with respect to the support disk 6.

In addition, means for balancing the weight of an optical or video-photographic apparatus when rotated about the tilt axis X, based on torque spring 310, interposed between the second body 303 and the third body 304, and controlled by a selector knob 311, are provided.

A pin 320, parallel to the level axis Z, is received in the second portion 303b of the second body 303 in order to engage proper recesses 321 defined in the first body 302. Pin 320 is urged against the first body 302 by a spring 322 and is controlled by a selector 323.

Recesses 321 are conveniently defined at special angular relative positions between the first and the second body 302, 303, for instance at 0° and at 90°, useful to move the optical or video-photographical apparatus between a landscape position and a portrait position.

The head 300 further comprises locking means 330 able to lock or unlock both the relative rotation of the first and second bodies 302, 303 about the first axis Z and the rotation of the second and third bodies 303, 304 about the second axis X.

The locking means 330 comprises a control member 331 which includes a knob 340, coaxial with the tilt axis X and connected to the third body 304 at the side opposite the second body 303 so that the knob 340 can be operated directly by a user in order to rotate about the tilt axis X with respect to the third body 304.

The locking means 330 further comprises a tie-rod 350 extending through the third portion 303c of the second body 303 and the third body 304 along the tilt axis X and is connected at a first end thereof to the control member 331 and at the opposite end thereof to a slider 355.

Tie-rod 350 is engaged in a threaded manner with a nut 341 housed in the knob 340 and comprises a portion 351 which has a non-circular cross-section and which is received in a seat having a corresponding cross-section and formed in the third body 304, which prevents the relative rotation about the tilt axis X of the tie-rod 350 with respect to the third body 304.

By means of this arrangement, a rotation of knob 340 causes the tie-rod 350 and the slider 355 to move in translation along the tilt axis X.

Slider 355 is received in a recess 352 formed between the first body 302 and the second portion 303b of the second body 303 and is displaceable along the tilt axis X when moved by the tie-rod 350.

Preferably, slider 355 has the form of a ring provided with a trough hole traversed by the threaded pin 307.

The ring forming the slider 355 comprises a main axis parallel to the level axis Z, a first base 356 parallel to the tilt axis X and leant against the first body 302, as well as a second opposite basis 353 whose surface is inclined relative to both level axis Z and tilt axis X and leant against a corresponding inclined surface 357 provided on the second portion 303b of the second body 303.

Preferably, surface 353 is inclined towards the third body 304 and is inclined with respect to the tilt axis X of an angle comprised between 20° and 30°, most preferably of an angle of about 25°.

The initial relative position between the slider 355 and the knob 340 is adjustable by means of a knob 333, coaxially received in the knob 340. In this way the minimum friction between the second and the third body 303, 304 is adjustable.

The locking of the rotation of an optical or video-photographic apparatus mounted on the head 300 about the level axis Z and tilt axis X is brought about by rotating the knob 340, which brings about translation of tie rod 350 and slider 355 along the tilt axis X.

The translation along the tilt axis X of the slider 355 towards the control member 331, causes the same to abut against the second portion 303b of the second body 303 in correspondence of the respective inclined surfaces 353, 357 and, accordingly, to transmit to the same a force having a first component parallel to the tilt axis X and a second component parallel to the level axis Z. This latter causes the second portion 303b to move away from the first body 302 along the level axis Z and as a consequence the first portion 303a of the second body 303 to move against the first body 302. In this way, the movement of the slider 355 brings about a movement of the first body 302 along the level axis Z against the first portion 303a of the second body 303 and, at the same time, also a movement of the second body 303 along the tilt axis X against the third body 304.

In order to improve the efficiency of the locking action, a first ring 312 and a second ring 354, realized in material having a high friction coefficient, are interposed between the first body 302 and the first portion 303a of the second body 303 and between the third body 304 and the third portion 303c of the second body 303.

Conveniently, rings 312 and 354 are located at a section having a diameter as large as possible, in order to maximise the contact surface with the bodies 302, 303 and 304 to be locked.

Although in the preferred embodiment here described the inclined surface 353 is defined on slider 353 and a corresponding inclined surface 357 is defined on the second portion 303b, it is understood that the same effect may be obtained with only one surface properly inclined, possibly curved, which may be defined in any of the first body 3002, the second body 303 and the slider 355.

It will be noted that the force applied by the slider 355 to the second body 303 is opposed, in terms of the component thereof parallel with the tilt axis X, by the control member 331, so that the third body 304 is clamped between the control member 331 and the second body 303, locking the relative rotation thereof about the tilt axis X.

Thanks to the arrangement of the locking means 330 described above, an effective simultaneity and uniformity of the two locking actions (relative to the rotation about the level axis Z and the tilt axis X) is obtained. Further, angular movements during the locking action are further prevented, eliminating or at least substantially limiting the "drift effect".

It will be appreciated that this configuration of locking means 330 allows an increased efficiency of the locking actions, because both the relative movement of the first body 302 against the second body 303 and the relative movement of the third body 304 against the second body 303 are carried out along respective rotation axis, thus providing a more effective locking action with respect to a tangential breaking.

Unlocking the rotations of the head 300 is simply brought about by rotating the knob 340 at the opposite side.

Therefore, the present invention solves the problem set out above with reference to the cited prior art, at the same time providing a number of other advantages, including the possibility of using "standard" dimensional tolerances (therefore, which are not excessively narrow and costly).

The invention claimed is:

1. A support head for an optical or video-photographic apparatus, comprising:
    a first body traversed by a first axis (Z) of rotation of the apparatus with respect to a base of the head,
    a second body coupled in a rotary manner to the first body in order to rotate about the first axis,
    a third body traversed by a second axis (X) of rotation of the apparatus with respect to a base of the head, this second axis being substantially perpendicular to the first axis, and the third body being coupled in a rotary manner to the second body in order to rotate about this second axis, and
    locking means able to lock, by a single movement of a control member which may be carried out directly by a user, both the relative rotation of the first and second bodies about the first axis (Z) and the rotation of the second and third bodies about the second axis Y,
wherein the locking means comprises a tie-rod extended from the control member along the second axis (X) and displaceable in translation along the second axis, as well as a slider connected to the tie-rod and interposed between the first body and the second body, a surface inclined with respect to both the first and the second axis being defined on the slider and/or the first or the second body, so that when the slider is displaced along the second axis, the slider abuts the first or the second body in correspondence of said inclined surface, so as to displace the first body along the first axis against the second body, to lock the relative rotation of the first body with respect to the second body, and to displace the second body along the second axis against the third body to lock the relative rotation of the second body with respect to the third body.

2. The support head according to claim 1, wherein the first body is housed between a first and a second portion of the second body provided opposite to the first body with respect to the first axis (Z).

3. The support head according to claim 2, wherein the slider is housed between the first body and the second portion of the second body, so that when said second portion is moved away from the first body along the first axis (Z), the first portion of the second body is moved against the first body.

4. The support head according to claim 3, wherein a ring having a high friction coefficient is interposed between the first body and the first portion of the second body.

5. The support head according to claim 3, wherein the slider has a surface inclined with respect to both the first and the second axis abutting against a corresponding inclined surface defined on the second portion of the second body.

6. The support head according to claim 5, wherein said inclined surface is inclined of an angle comprised between 20° and 30° with respect to the second axis (X).

7. The support head according to claim 6, wherein said inclined surface is inclined of an angle of 25° with respect to the second axis.

8. The support head according to claim 1, wherein a ring having a high friction coefficient is interposed between the second body and the third body.

9. The support head according to claim 1, wherein the control member comprises a knob coupled to the third body opposite to the second body with respect to the second axis (X), the knob being rotatable about the second axis of rotation with respect to the third body and screw-engaged with the tie-rod, which is not rotatable about the second axis of rotation with respect to the third body, so that a rotation of the knob causes the tie-rod to move in translation along the second axis of rotation.

10. The support head according to claim 1, wherein a pin defining the first axis (Z) is provided between the first and the second body and the slider comprises a through hole traversed by said pin.

11. The support head according to claim 1, wherein the third body comprises a base of the head provided with means for coupling to an external support of the head and the first body is provided with means for attachment to the optical or video-photographic apparatus and wherein the first axis of rotation defines a level axis (Z) of the head and the second axis of rotation defines a tilt axis (X) of the head.

* * * * *